(No Model.)
F. I. LEONARD.
TRUNK.
No. 551,975. Patented Dec. 24, 1895.
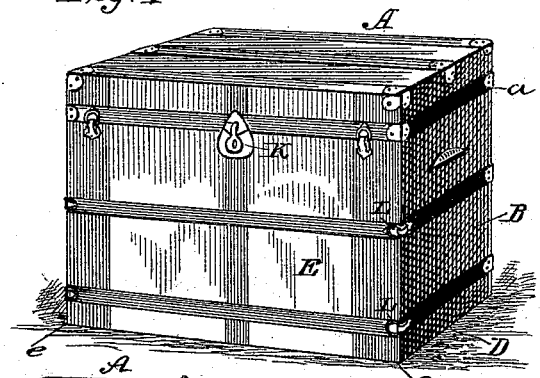
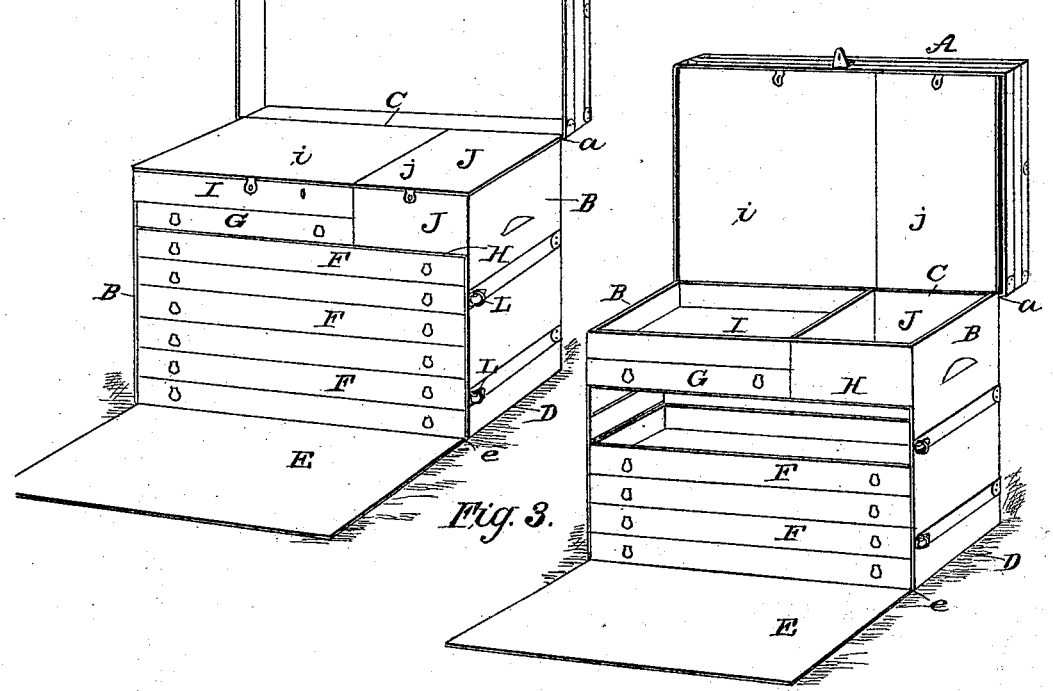
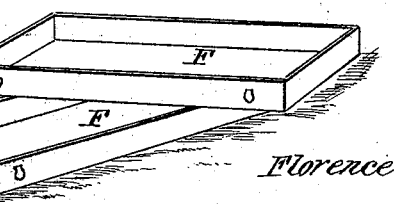
WITNESSES:
Fred G. Dieterich
P. B. Turpin
INVENTOR
Florence I. Leonard
BY Munn & Co.
ATTORNEYS.

UNITED STATES PATENT OFFICE.

FLORENCE IRENE LEONARD, OF ARLINGTON, GEORGIA.

TRUNK.

SPECIFICATION forming part of Letters Patent No. 551,975, dated December 24, 1895.

Application filed December 6, 1894. Renewed October 28, 1895. Serial No. 567,163. (No model.)

*To all whom it may concern:*

Be it known that I, FLORENCE IRENE LEONARD, of Arlington, in the county of Calhoun and State of Georgia, have invented a new and useful Improvement in Trunks, of which the following is a specification.

My invention is an improvement in trunks, and has for an object to provide a trunk which shall be especially adapted for summer or other outing trips, but which shall also be useful for ordinary travel and other purposes; and the invention consists in the novel constructions, combinations and arrangements of parts, as will be hereinafter described, and pointed out in the claim.

In the drawings, Figure 1 is a perspective view of the trunk closed and fastened. Fig. 2 is a similar view with the lid raised and front lowered, the lids of the hat-box and top tray being closed. Fig. 3 is a similar view to Fig. 2, the hat-box and tray-lids being opened and two of the large sliding trays being withdrawn.

The general shape of the trunk may be similar to the conventional trunk. Its lid or top A is hinged at *a* and its ends B B are rigid with its back C and bottom D. Its front E is hinged at its edge *e* so it can open, as shown in Fig. 2, to expose and permit the withdrawal of the long trays F and short tray G.

The trunk has, at a suitable distance from its top, a cross-plate or partition H rigid with the ends and back of the trunk and operating, in addition to its other functions, to give rigidity to the trunk and preserve the same strongly at all times whether the trays be in place or withdrawn from the trunk. Suitable guides are provided below the cross-partition H for the long trays F, while the short sliding tray slides in above said partition and below the small fixed tray I at the top of the trunk. Above the cross-partition H, and alongside the short tray G and the fixed tray I, I provide a hat-box J, which in practice should be large enough to contain several hats, usually one large and two small hats, and such box J and the fixed tray I have separate and independent lids *j* and *i*.

In use the trays may some or all be packed and access may be gained at any time to the contents of any one of same without disturbing or in any way displacing any one or more of the other trays, avoiding the inconvenience and time necessary to lift out and replace trays so common in the use of ordinary trunks when it is desired to gain access to the lower portions thereof. The hinged front when closed is secured by the lock K to the trunk top and fastenings L are also provided for securing such front to the ends of the trunk.

Having thus described my invention, what I claim as new, and desire to secure by Letters Patent, is—

The trunk herein described consisting of the fixed back, bottom and ends, the series of drawers sliding in and out above the bottom and extending from end to end of the trunk, the cross plate or partition extended between the ends of the trunk above the lower series of drawers, the hat box fixed on said partition at one end thereof and extended upward to the top line of the trunk ends, said hat box being closed at front and provided with a hinged lid, the box like fixed tray extended between the upper edge of the inner side of the hat box and the opposite end of the trunk and fixed rigidly to both such parts and to the back of the trunk forming with the hat box at all times a box like brace for the upper part of the trunk the hinged lid for the fixed tray, the short drawer sliding in the space below such fixed tray and above the cross partition the hinged front and the top all substantially as and for the purposes set forth.

FLORENCE IRENE LEONARD.

Witnesses:
R. H. BOSTWICK,
J. E. TOOLE.